United States Patent
Yoshinari et al.

(10) Patent No.: US 9,606,872 B2
(45) Date of Patent: Mar. 28, 2017

(54) VIRTUAL COMPUTER SYSTEM, PRINTER CONTROL SYSTEM, VIRTUAL COMPUTATION METHOD, PRINTER CONTROL METHOD, AND STORAGE MEDIA

(71) Applicant: FUJI XEROX CO., LTD., Tokyo (JP)

(72) Inventors: Toshiaki Yoshinari, Kanagawa (JP); Bo Liu, Kanagawa (JP); Takuya Mizuguchi, Kanagawa (JP); Toshio Kamada, Kanagawa (JP); Katsuyuki Asai, Kanagawa (JP); Kentaro Ikeda, Kanagawa (JP); Kazuki Nagashima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 124 days.

(21) Appl. No.: 14/606,057

(22) Filed: Jan. 27, 2015

(65) Prior Publication Data

US 2016/0077921 A1   Mar. 17, 2016

(30) Foreign Application Priority Data

Sep. 12, 2014   (JP) .................... 2014-186808

(51) Int. Cl.
| | | |
|---|---|---|
| *G06F 11/00* | (2006.01) | |
| *G06F 11/14* | (2006.01) | |
| *G06F 9/00* | (2006.01) | |
| *G06F 3/12* | (2006.01) | |

(52) U.S. Cl.
CPC ............ *G06F 11/1451* (2013.01); *G06F 9/00* (2013.01); *G06F 11/1438* (2013.01); *G06F 11/1469* (2013.01); *G06F 3/1234* (2013.01); *G06F 2201/815* (2013.01); *G06F 2201/84* (2013.01)

(58) Field of Classification Search
CPC ............ G06F 11/1433; G06F 11/1448; G06F 11/1451; G06F 11/1458; G06F 11/1469; G06F 3/1234
See application file for complete search history.

(56) References Cited

U.S. PATENT DOCUMENTS

| | | | |
|---|---|---|---|
| 8,307,363 B2 | 11/2012 | Nakai | |
| 8,364,639 B1 * | 1/2013 | Koryakina | ......... G06F 11/1458 707/639 |
| 8,365,167 B2 * | 1/2013 | Beaty | .................... G06F 9/5077 717/172 |
| 8,788,746 B2 | 7/2014 | Matsushima et al. | |

(Continued)

FOREIGN PATENT DOCUMENTS

| | | | |
|---|---|---|---|
| GB | WO 2012143844 A1 * | 10/2012 | ......... G06F 11/1438 |
| JP | 2000-132432 A | 5/2000 | |

(Continued)

*Primary Examiner* — Joseph Kudirka
(74) *Attorney, Agent, or Firm* — Sughrue Mion, PLLC

(57) ABSTRACT

A virtual computer system includes a first saving unit that saves at least one or more snapshots each having recorded therein a state of a virtual machine, the state including an application program installed on the virtual machine, the snapshot being saved as a reference snapshot; an applying unit that applies the reference snapshot to the virtual machine when an execution request for the application program is received; and a second saving unit that saves a state of the virtual machine that executes the application program, the state being saved as a snapshot.

8 Claims, 9 Drawing Sheets

(56) References Cited

U.S. PATENT DOCUMENTS

| 9,298,372 B2* | 3/2016 | Schott ................... G06F 3/0608 |
| 2007/0300221 A1* | 12/2007 | Hartz .................... G06F 3/1222 |
| | | 718/1 |
| 2008/0181504 A1 | 7/2008 | Kudomi |
| 2012/0158665 A1* | 6/2012 | Lee ..................... G06F 11/1448 |
| | | 707/678 |
| 2013/0094054 A1 | 4/2013 | Baba |

FOREIGN PATENT DOCUMENTS

| JP | 2004-185345 A | 7/2004 |
| JP | 2008-186417 A | 8/2008 |
| JP | 2010-218399 A | 9/2010 |
| JP | 2011-60055 A | 3/2011 |
| JP | 2013-101596 A | 5/2013 |
| JP | 2013-235317 A | 11/2013 |
| JP | 2014-32498 A | 2/2014 |

\* cited by examiner

VIRTUAL COMPUTER SYSTEM, PRINTER CONTROL SYSTEM, VIRTUAL COMPUTATION METHOD, PRINTER CONTROL METHOD, AND STORAGE MEDIA

CROSS-REFERENCE TO RELATED APPLICATIONS

This application is based on and claims priority under 35 USC 119 from Japanese Patent Application No. 2014-186808 filed Sep. 12, 2014.

BACKGROUND

The present invention relates to a virtual computer system, a printer control system, a virtual computation method, a printer control method, a storage medium storing a virtual computer program, and a storage medium storing a printer control program.

SUMMARY

According to an aspect of the invention, there is provided a virtual computer system including a first saving unit that saves at least one or more snapshots each having recorded therein a state of a virtual machine, the state including an application program installed on the virtual machine, the snapshot being saved as a reference snapshot; an applying unit that applies the reference snapshot to the virtual machine when an execution request for the application program is received; and a second saving unit that saves a state of the virtual machine that executes the application program, the state being saved as a snapshot.

BRIEF DESCRIPTION OF THE DRAWINGS

An exemplary embodiment of the present invention will be described in detail based on the following figures, wherein.

DETAILED DESCRIPTION

Figure 10:
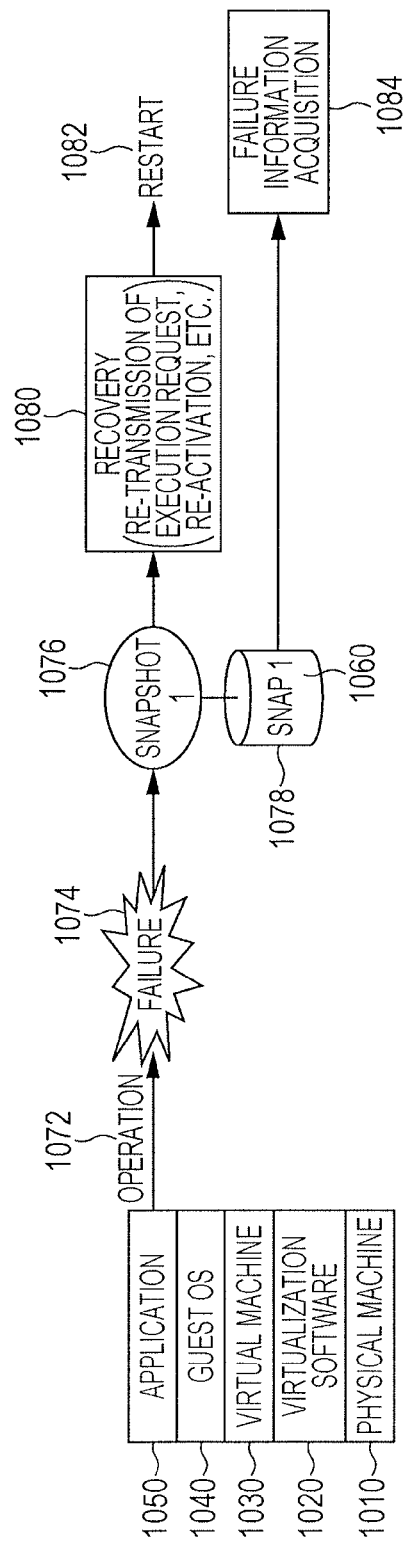
FIG. 10 is an explanatory diagram showing a prerequisite technology example.

First, before an exemplary embodiment is described, its prerequisite technology is described with reference to examples in FIGS. 10 and 11. This description is given for easier understanding of this exemplary embodiment.

There is a technology called virtualization system. The virtualization system is a technology that causes plural operating systems (OSs) to operate on a single physical machine 1010 (hardware). As shown in the example in FIG. 10, a virtual machine (also called virtual hardware) 1030 with virtualization software 1020 is constructed on the physical machine 1010, a guest OS 1040 is installed thereon, and further an application 1050 being an application program is installed on the guest OS 1040. The example in FIG. 10 provides an example of the single virtual machine 1030; however, plural virtual machines 1030 are typically constructed on the virtualization software 1020.

The virtualization software 1020 is software that allows parallel coexistence of plural guest OSs 1040 on the physical machine 1010. That is, the virtualization software 1020 constructs hardware, such as a CPU, a memory, and an HDD, in terms of software, and prepares hardware resources to be used by the guest OS 1040 as the virtual machines 1030.

For example, the application 1050 may be a printer control program.

In this case, the virtual machines are isolated from each other. Even if a failure (for example, crush) occurs in a certain virtual machine, the printer control program on the other virtual machine is continuously operated, and hence printing is available.

Described below is an example in which the printer control program is operated in the virtualization system.

(1) As an operation 1072 of the virtualization system, the application 1050 is operated, and a print job is executed.

(2) If a failure 1074 occurs, the virtualization software 1020 immediately creates a snapshot 1: 1076 of the virtual machine 1030. Then, a storage area 1060 stores the snapshot 1: 1076 as a snap 1: 1078. The snapshot is a function of saving the state of the virtual machine.

(3) Then, the application 1050 is re-activated, a print job is re-transmitted, or re-boot is executed, so that recovery 1080 of the failure is executed, and the print job is restarted (print job restart 1082).

(4) During an idle time, for example, while the application 1050 is not operated, the snapshot is called, then failure information is acquired (failure information acquisition 1084), or a snapshot is collected. This information processing device executes the processing of acquiring the failure information (the failure information acquisition 1084); or the other information processing device may execute the processing. Of course, the other information processing device does not have to execute the processing of acquiring the failure information (the failure information acquisition 1084).

The snapshot is created by only creating a file (empty file) in which subsequent processing is written. The creation of the snapshot takes a shorter time than that when failure information is collected in related art.

A differential file after the creation of the snapshot is increased in size by a later operation. If required, merge processing is executed. If the differential file is increased in size, the merge processing may require a time.

In general, Acquisition of failure information represents collection of logs. If information is insufficient only with the log, a snapshot of the virtual machine 1030 is collected.

By collecting a snapshot, the environment in which a failure occurs may be reproduced.

Figure 11:
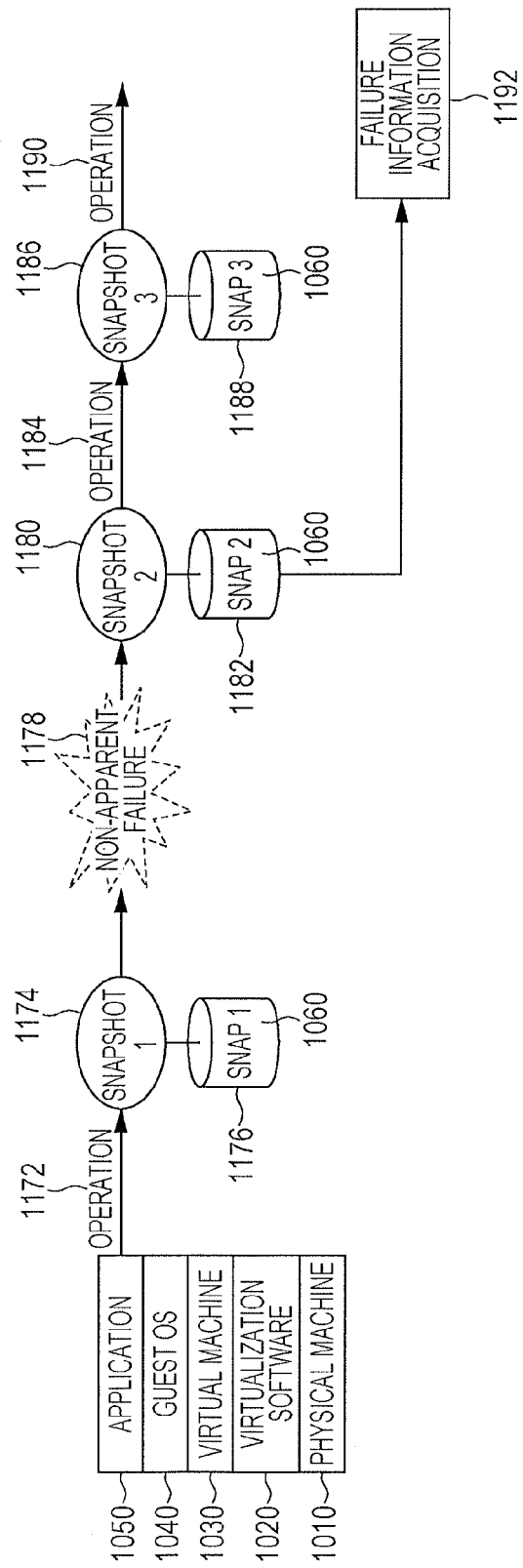
FIG. 11 is an explanatory diagram showing a prerequisite technology example.

Also, as shown in an example in FIG. 11, if a snapshot is periodically or non-periodically acquired, failure information in the past may be acquired. To be specific, processing is executed as follows.

(1) As an operation 1172 of the virtualization system, the application 1050 is operated, and a print job is executed.

(2) A snapshot 1: 1174 is periodically or non-periodically acquired, and is stored as a snap 1: 1176 in the storage area 1060.

(3) In the operation 1172, a non-apparent failure 1178, such as garbling of characters (a phenomenon in which an expected character is not printed) may occur in the print job.

(4) Then, a snapshot 2: 1180 is periodically or non-periodically acquired, and is stored as a snap 2: 1182 in the storage area 1060. Further, in a subsequent operation 1184, a snapshot 3: 1186 is acquired, and is stored as a snap 3: 1188 in the storage area 1060. An operation 1190 is continuously executed.

(5) If it is found that the non-apparent failure 1178 occurs in an inspection work for a printed matter (a product of a print job), failure information is acquired (failure information acquisition 1192) from the snapshot 2: 1180 (the snap 2: 1182 in the storage area 1060) after the non-apparent failure 1178, or a snapshot is collected. This information processing device executes the processing of acquiring the failure information (the failure information acquisition 1192); or the other information processing device may execute the processing. Of course, the other information processing device does not have to execute the processing of acquiring the failure information (the failure information acquisition 1192).

In this case, since plural snapshots are present, the occupied volume in the disk of the storage area 1060 increases. Also, since multi-level snapshots are formed, the performance decreases.

Therefore, old snapshots have to be merged. However, the entire processing has to be stopped during the merge. If the number of snapshots is increased, the stopped period is increased. If the number of snapshots is decreased, the ability to respond to the non-apparent failure 1178 is degraded.

Also, when the guest OS 1040 and the application 1050 are changed (for example, updated), the contents are transferred. If a system setting file or other file is damaged or a setting error or other error occurs in the middle of the transfer, the return point of the transfer is hardly found, or even the return may not be made after the merge of snapshots.

Hereinafter, a desirable exemplary embodiment is described for implementation of the invention with reference to the drawings.

Figure 1:
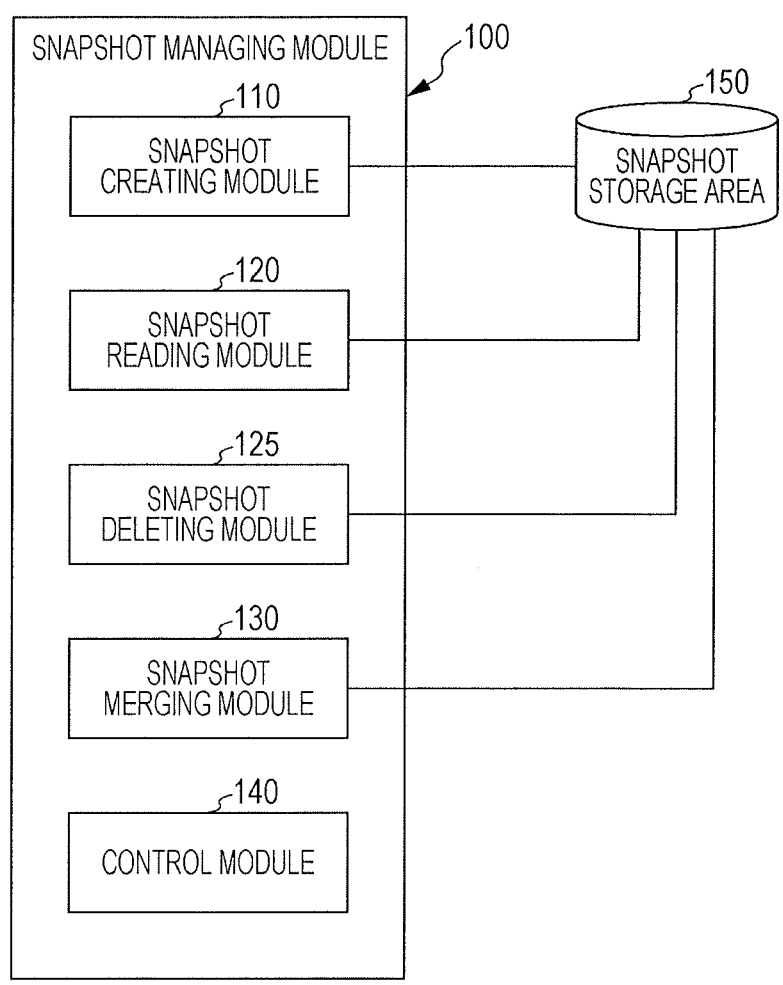
FIG. 1 is a conceptual module configuration diagram for a configuration example of an exemplary embodiment.

FIG. 1 is a conceptual module configuration diagram for a configuration example of this exemplary embodiment.

A module represents a component, such as software (a computer program) or hardware, which may be generally logically separated. Hence, a module in this exemplary embodiment represents not only a module in a computer program, but also a module in a hardware configuration. Therefore, description in this exemplary embodiment also involves a computer program that causes a computer to function as such a module (a program that causes a computer to execute respective steps, a program that causes a computer to function as respective units, and a program that causes a computer to provide respective functions), a system, and a method. For convenience of description, wordings "store," "cause . . . to store," and other wordings equivalent thereto are used. These wordings represent causing a memory to store . . . or controlling a memory to store . . . in the case in which the exemplary embodiment is a computer program. Also, modules may correspond to functions one by one. However, when being mounted, a single module may be formed of a single program, plural modules may be formed of a single program, or a single module may be formed of plural programs. Also, plural modules may be executed by a single computer, or a single module may be executed by plural computers in a distributed or parallel environment. A single module may include other module. Also, "connection" is used for physical connection, and logical connection (for example, transmission and reception of data, an instruction, reference relationship among data). An expression "predetermined" represents being determined before subject processing. The situation includes a situation before processing according to this exemplary embodiment is started, and a situation even after processing according to this exemplary embodiment is started as long as the situation is before subject processing. In other words, the expression "predetermined" is used as being determined in accordance with the condition and state of the current situation, or the condition and state of the previous situation. If there are plural "predetermined values," the values may be different, or two or more values (of course, all the values) may be the same. Also, wordings "if A, do B" is used as "determining whether A or not, and doing B if it is determined as A," unless otherwise the determination whether A or not is not required.

Also, a system or a device includes a case in which a system or a device is formed of plural computers, hardware, plural devices, etc., connected by a communication measure such as a network (including communication connection of one-to-one correspondence), and a case in which a system or a device is provided by a single computer, hardware, a single device, etc. A "device" and a "system" are used as mutually equivalent words. Of course, a "system" does not include a social "scheme" (social system) that is merely an artificial agreement.

Also, subject information is read from a memory every processing of each module or every processing if plural steps of processing are executed in a module, and after the processing, processing result is written out to the memory. Hence, the description of reading from the memory before the processing and writing out to the memory after the processing may be occasionally omitted. In this case, a memory may include a hard disk, a random access memory (RAM), an external storage medium, a memory arranged via a communication line, and a register in a central processing unit (CPU).

As shown in an example in FIG. 1, the snapshot managing module 100 includes a snapshot creating module 110, a snapshot reading module 120, a snapshot deleting module 125, a snapshot merging module 130, and a control module 140.

Figure 7:
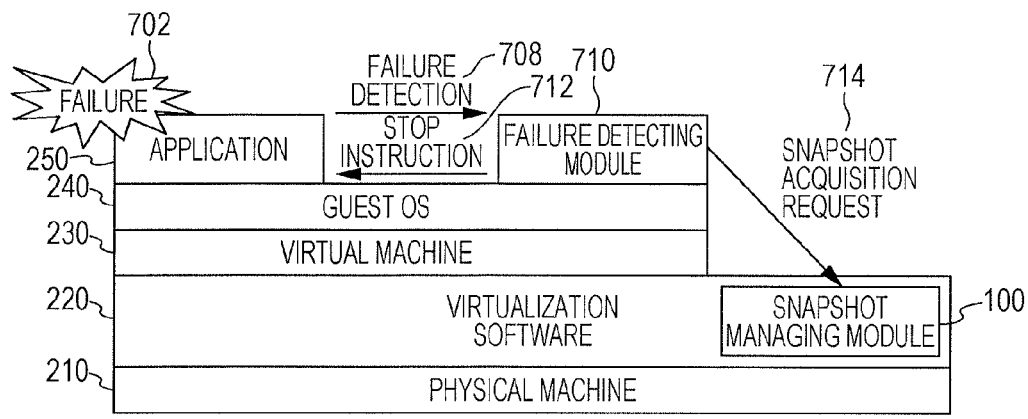
FIG. 7 is an explanatory diagram showing a processing example according to the exemplary embodiment.

The snapshot managing module 100 is a function included in virtualization software, in particular, a function of creating, reading (reproducing), deleting, and merging a snapshot. It is to be noted that processing (creation, reproduction, etc.) on a snapshot is basically executed in accordance with a designation by a user. Also, other software may activate or access the snapshot managing module 100 as an option. The latter case will be described later with reference to examples in FIGS. 7 and 8.

The snapshot creating module 110 is connected to a snapshot storage area 150. The snapshot creating module 110 saves a snapshot having recorded therein the state of a virtual machine including an application program installed on the virtual machine, as a reference snapshot in the snapshot storage area 150.

The snapshot reading module 120 is connected to the snapshot storage area 150. The snapshot reading module 120 applies the reference snapshot in the snapshot storage area 150 to the virtual machine when an execution request for the application program is received. Then, the application program may be executed. The situation "after the application of the reference snapshot to the virtual machine" represents a situation in which "the virtual machine is caused to read the reference snapshot and allowed to execute the application program."

Also, the snapshot reading module 120 may apply the reference snapshot to the virtual machine for execution of predetermined processing.

The snapshot creating module 110 saves the state of the virtual machine that executes the application program, as a snapshot in the snapshot storage area 150.

Also, the snapshot creating module 110 may save the state of the virtual machine that executes the application program after the application program is executed and the predetermined processing is ended, as a snapshot in the snapshot storage area 150.

The snapshot deleting module 125 is connected to the snapshot storage area 150. The snapshot deleting module 125 deletes a snapshot stored in the snapshot storage area 150.

The snapshot merging module 130 is connected to the snapshot storage area 150. The snapshot merging module 130 merges (executes coupling processing on) snapshots stored in the snapshot storage area 150.

The snapshot storage area 150 is connected to the snapshot creating module 110, the snapshot reading module 120, the snapshot deleting module 125, and the snapshot merging module 130. The snapshot reading module 120, the snapshot deleting module 125, and the snapshot merging module 130 each make an access to the snapshot storage area 150. The snapshot storage area 150 stores a snapshot and a reference snapshot. That is, a common storage area in which plural snapshots may be referenced is provided. Alternatively, in addition to the snapshot storage area 150, a common storage area commonly available for virtual machines that are recorded in snapshots saved in the snapshot storage area 150 may be provided. In this case, "a virtual machine recorded in a snapshot" represents "a virtual machine with snapshot processing applied (a virtual machine included in a snapshot)." For example, the common storage area may be commonly used in an operation 616 and an operation 632 shown in an example in FIG. 6 (described later).

If the control module 140 detects a failure relating to an application program during execution of the application program, the control module 140 temporarily stops the application program, and requests the snapshot creating module 110 to acquire a snapshot. In response to the request, the snapshot creating module 110 creates a snapshot, and stores the snapshot in the snapshot storage area 150. In this case, a failure may be automatically detected, the application program may be automatically stopped, and a snapshot may be automatically acquired. This function of the control module 140 does not have to be provided in the snapshot managing module 100. As shown in an example in FIG. 7 (described later), this function may be constructed as a failure detecting module 710.

Also, the control module 140 may monitor the total storage volume of snapshots saved in the snapshot storage area 150, and if the total storage volume is larger than a predetermined volume or equal to or larger than the predetermined volume, the control module 140 may delete a snapshot in the snapshot storage area 150 in order from a snapshot, the saved timing of which is the oldest. That is, to ensure the storage area in the snapshot storage area 150, a snapshot is deleted in order from the oldest one. This function of the control module 140 does not have to be provided in the snapshot managing module 100. As shown in an example in FIG. 8 (described later), this function may be constructed as a snapshot volume monitoring module 810.

Figure 2:
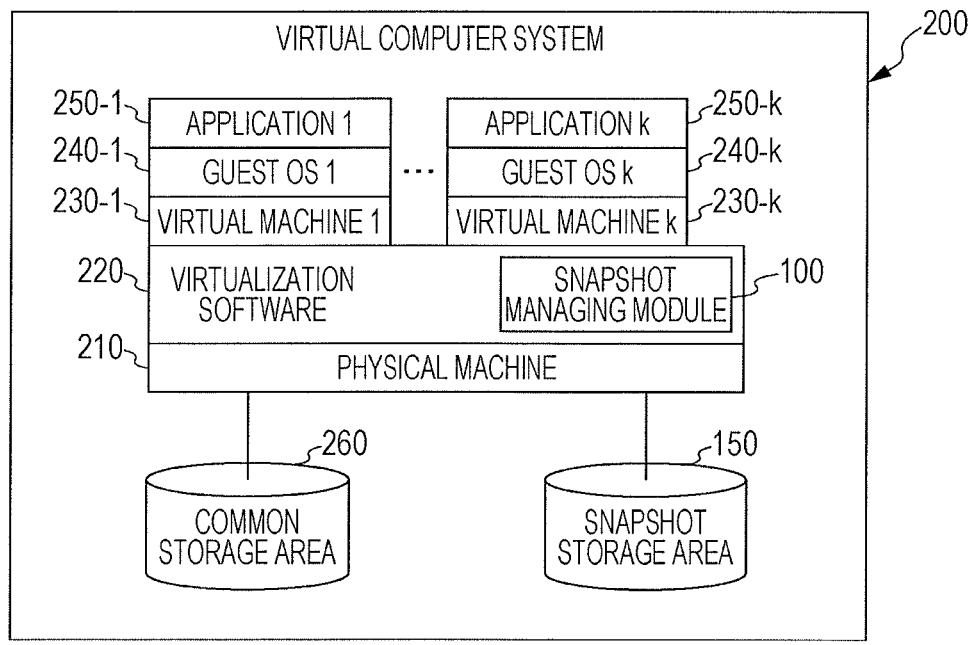
FIG. 2 is an explanatory diagram showing a system configuration example of a virtual computer system to which the exemplary embodiment is applied.

FIG. 2 is an explanatory diagram showing a system configuration example of a virtual computer system 200 to which this exemplary embodiment is applied.

The virtual computer system 200 includes a physical machine 210, virtualization software 220, plural virtualization systems (a virtual machine 1: 230-1, a guest OS 1: 240-1, an application 1: 250-1, a virtual machine k: 230-*k*, a guest OS k: 240-*k*, and an application k: 250-*k*) constructed on the virtualization software 220, a common storage area 260, and the snapshot storage area 150. The virtualization software 220 includes the snapshot managing module 100. The physical machine 210 is connected to the snapshot storage area 150 and the common storage area 260.

That is, the guest OS 240 is installed on the virtual machine 230, and the application 250 is installed on the guest OS 240.

If at least one of the application 250 and the guest OS 240 is updated, the snapshot creating module 110 of the snapshot managing module 100 newly saves a snapshot having recorded therein the state of the virtual machine 230 including the updated application 250 or the updated guest OS 240, as a reference snapshot, in the snapshot storage area 150. The "update" mentioned here is, for example, so-called patch processing. In this case, the "update" represents changing a reference shot to a state applied with a patch.

A printer control program is described below as an example of the application 250.

The snapshot managing module 100 (the snapshot creating module 110) creates a snapshot having recorded therein the state of a virtual machine including a printer control program being the application 250 that operates on the guest OS 240 installed on the virtual machine 230.

The snapshot managing module 100 (the snapshot creating module 110) stores a snapshot created after the printer control program is installed and initialized among snapshots created as described above, as a reference snapshot, in the snapshot storage area 150 and manages the reference snapshot. That is, a snapshot before the processing of the printer control program is applied (after the initialization) serves as a reference snapshot.

In response to an application instruction of a reference snapshot from a user (or an instruction from a shell program or the like), the snapshot managing module 100 (the snapshot reading module 120) causes the virtual machine 230 to read the reference snapshot, and executes the printer control program in accordance with the instruction by the user. That is, the printer control program is executed in the state after the initialization.

Alternatively, the snapshot managing module 100 (the control module 140) may create a job snapshot having recorded therein every print job the state of the virtual machine 230 that executes the application program, store the snapshot in the snapshot storage area 150, and manage the snapshot. In this case, a snapshot may be periodically or non-periodically created. For example, "periodical" creation may be creation every predetermined period (for example, once a day) or creation every time when a print job is ended. Also, "non-periodical" creation may be creation in response to an instruction from a user (an administrator or the like). For example, a "non-periodical" situation may be when occurrence of a failure is recognized by an inspection for a printed matter.

Also, the snapshot storage area 150 and the common storage area 260 are individually prepared. The snapshot storage area 150 stores snapshots (including a reference snapshot). The common storage area 260 stores an area commonly available for virtual machines 230 recorded in the snapshots stored in the snapshot storage area 150. As described above, for example, the common storage area 260 may be commonly used in the operation 616 and the operation 632 shown in the example in FIG. 6 (described later).

Also, the snapshot managing module 100 (including the control module 140, and the snapshot volume monitoring module 810 exemplarily shown in FIG. 8, described later) monitors the total storage volume of snapshots stored in the snapshot storage area 150. If the total storage volume is larger than a predetermined volume or equal to or larger than the predetermined volume, the snapshot managing module 100 may request the snapshot deleting module 125 to delete a snapshot that satisfies a predetermined condition among the snapshots in the snapshot storage area 150.

In this case, regarding the predetermined condition, a snapshot, the saved timing of which in the snapshot storage area 150 is the oldest, may be selected as a subject to be deleted. Alternatively, regarding the predetermined condition, a snapshot corresponding to a print job, an inspection for a relevant printed matter of which is completed, may be selected as a subject to be deleted.

Figure 3:
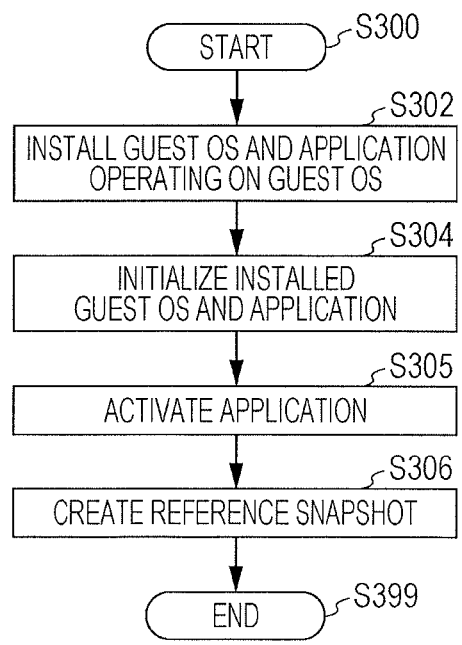
FIG. 3 is a flowchart showing a processing example according to the exemplary embodiment.

FIG. 3 is a flowchart showing a processing example according to this exemplary embodiment. Description is given by using the examples in FIGS. 6 and 7 (an example in which the application 250 serves as the printer control program).

Description is based on the following processing example.

(1) The execution of the application 250 is started every time in the state after the initialization. Multiple types of applications 250 are not executed but a single application 250 is operated on the guest OS 240.

(2) If a snapshot is created after the operation of the application 250, the snapshot is created while communication is not provided with an external device (for example, a printer). It is more desirable that the snapshot is created while the application 250 is stopped.

To apply a reference snapshot, the state returns to the initial state (in the example in FIG. 6, snap 0, snapshot 0: 612) and then printing is started. If the state does not return to the initial state but returns to a state in the middle of a print job, matching with an external device is no longer provided.

(3) Information such as a resource acquired during an operation may be occasionally used in another operation. To share such information in respective operations, such information, which has been arranged in the virtual machine 230 in related art, is arranged in the common storage area 260 outside the virtual machine 230.

(4) Further, to decrease the volume of snapshots, print data (input, intermediate, and/or final data), temporary files, and other files may be arranged in the common storage area 260 outside the virtual machine 230.

In step S300, this processing is started. In step S302, a guest OS and an application that operates on the guest OS are installed. As shown in the example in FIG. 6, for the virtual computer system 200, the guest OS 240 and the application 250 that operates on the guest OS 240 are installed, and hence a single virtual system is configured.

In step S304, the installed guest OS and application are initialized. As shown in the example in FIG. 6, the guest OS 240 and the application 250 in the virtual computer system 200 are initialized (initialization 610).

In step S305, the application is activated.

In step S306, the snapshot creating module 110 creates a reference snapshot. As shown in the example in FIG. 6, after the initialization 610, a snapshot 0: 612 is created. Then, the snapshot 0: 612 is stored in the snapshot storage area 150 as a snap 0: 614 being a reference snapshot. The processing in step S306 is executed before first print processing by the application 250 is executed. Thereafter, this reference snapshot is applied, and the print processing by the application 250 is executed. In step S399, this processing is ended.

Alternatively, to receive an execution request, restart a snapshot, and execute an application program, a shell program that activates the application program (a program having a function equivalent to a shell program) may be prepared in addition to the application program.

Figure 4:
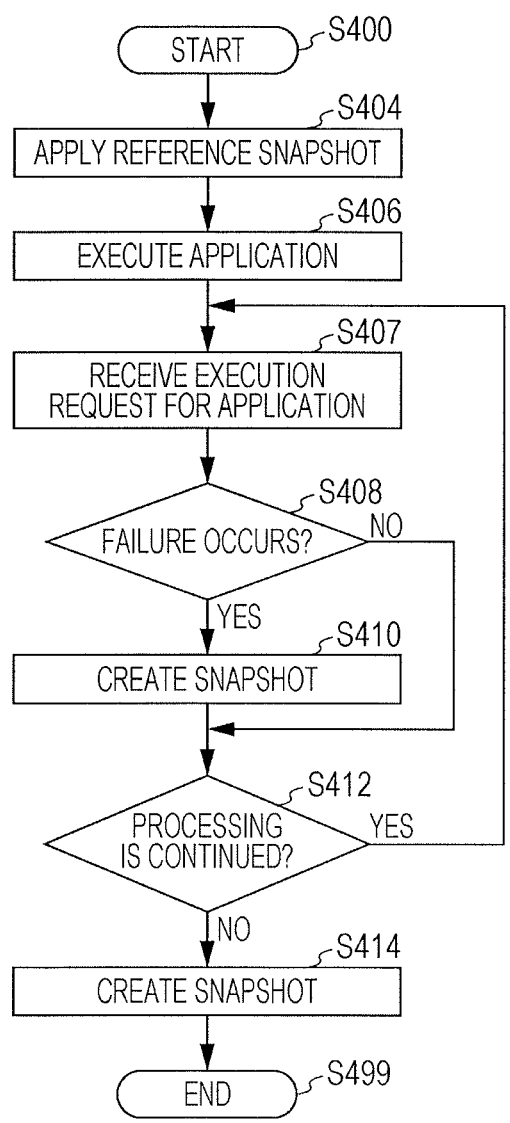
FIG. 4 is a flowchart showing a processing example according to the exemplary embodiment.

FIG. 4 is a flowchart showing a processing example according to this exemplary embodiment.

In step S400, this processing is started. In step S404, the snapshot reading module 120 applies a reference snapshot.

In step S406, an application is activated.

In step S407, an execution request for the application is received. As shown in the example in FIG. 6, the application 250 receives a print request as the operation 616 or the like, and starts processing.

In step S408, the failure detecting module 710 determines whether a failure is occurs or not. If a failure occurs, the processing goes to step S410. Otherwise the processing goes to step S412. As shown in the example in FIG. 7, if a failure 702 occurs in the application 250, the failure detecting module 710 detects the failure (failure detection 708), determines necessity of creation of a snapshot in accordance with the failure 702, and if it is determined as necessary, requests the snapshot managing module 100 to acquire a snapshot (snapshot acquisition request 714).

In step S410, the snapshot creating module 110 creates a snapshot. As shown in the example in FIG. 7, the failure detecting module 710 requests the snapshot managing module 100 to acquire a snapshot (snapshot acquisition request 714). The failure detecting module 710 instructs the application 250 to be stopped (stop instruction 712). Then, the snapshot managing module 100 creates a snapshot. Alternatively, the failure detecting module 710 may instruct the application 250 to be stopped (the stop instruction 712), and then may request the snapshot managing module 100 to acquire a snapshot (the snapshot acquisition request 714). Also, communication between the application 250 and the failure detecting module 710, and communication between the failure detecting module 710 and the snapshot managing module 100 may use data exchange function (for example, a function of file sharing, a function of a host-only adopter of a network adopter, etc.) in a virtualization system.

In step S412, it is determined whether the processing is continued or not. If the processing is continued (YES), the processing returns to step S407. Otherwise the processing goes to step S414.

In step S414, the snapshot creating module 110 creates a snapshot. Then, this processing is ended (S499).

Figure 6:
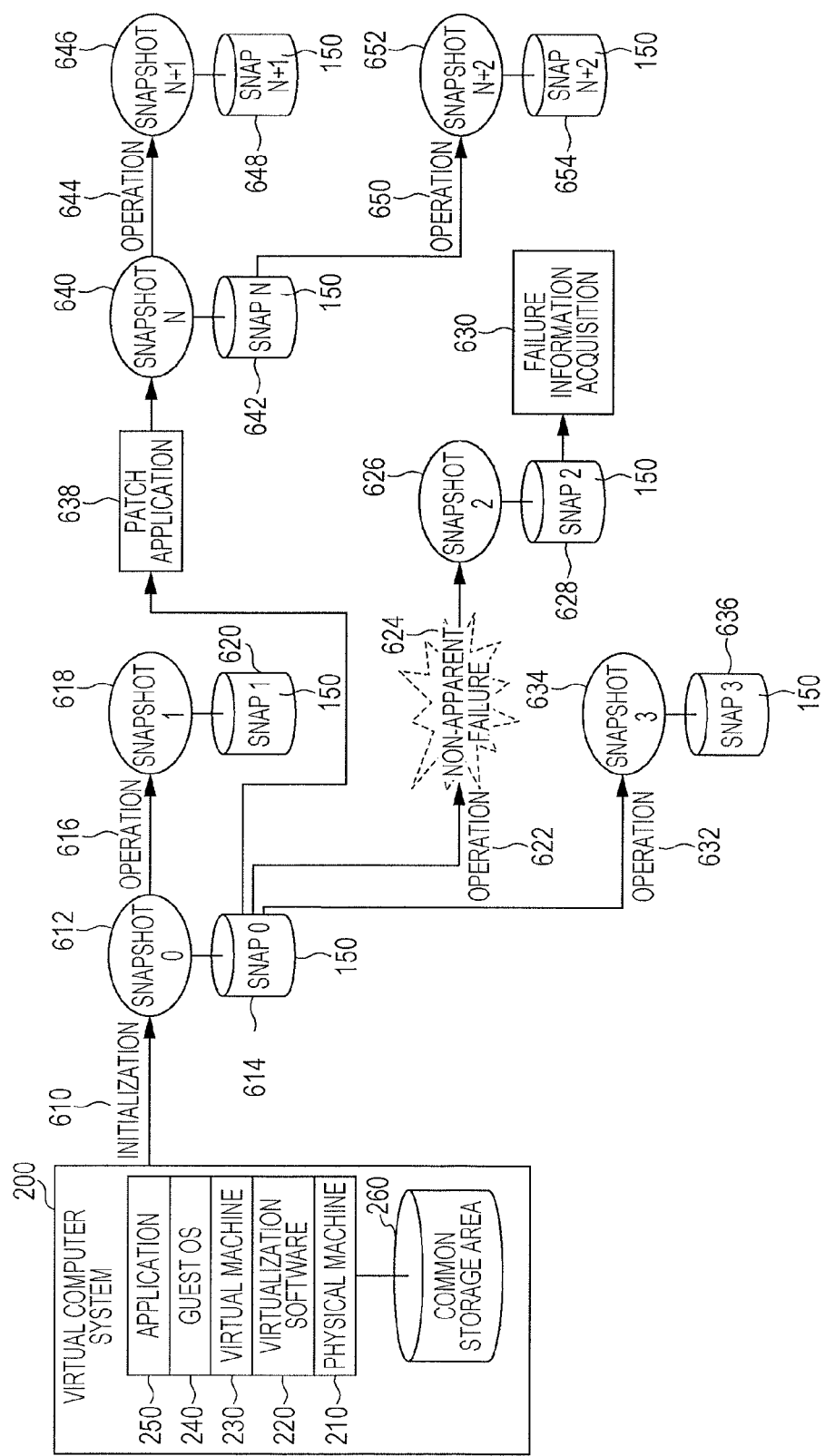
FIG. 6 is an explanatory diagram showing a processing example according to the exemplary embodiment.

Alternatively, as shown in the example in FIG. 6, after the operation 616 and the operation 632, a snapshot 1: 618 and a snapshot 3: 634 may be created, and may be respectively stored as a snap 1: 620 and a snap 3: 636 in the snapshot storage area 150. Also, even if a non-apparent failure 624 occurs during an operation 622, a snapshot 2: 626 may be similarly created and stored as a snap 2: 628 in the snapshot storage area 150. Then, failure information is acquired from the snap 2: 628 in the snapshot storage area 150 (failure information acquisition 630), and the cause etc. of the non-apparent failure 624 is analyzed by an administrator of the virtual computer system 200. The non-apparent failure 624 may not be detected by the failure detecting module 710, but occurrence of the non-apparent failure 624 may be detected by an inspection or the like for a printed matter.

Figure 5:
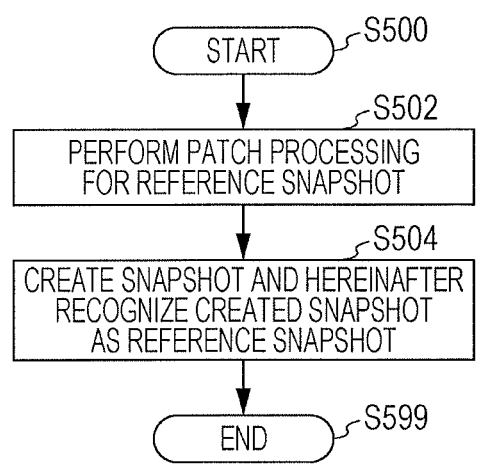
FIG. 5 is a flowchart showing a processing example according to the exemplary embodiment.

FIG. 5 is a flowchart showing a processing example according to this exemplary embodiment.

In step S500, this processing is started. In step S502, patch processing on a reference snapshot is executed. As shown in the example in FIG. 6, a patch is applied (patch application 638) on the snap 0: 614 in the snapshot storage area 150.

In step S504, the snapshot creating module 110 creates a snapshot, and hereinafter this snapshot is recognized as a reference snapshot. As shown in the example in FIG. 6, a snapshot N: 640 is created, and stored as a snap N: 642 being a reference snapshot in the snapshot storage area 150. In step S599, this processing is ended.

Then, similarly to the operation 616 and the operation 632, after an operation 644 and an operation 650, a snapshot N+1: 646 and a snapshot N+2: 652 may be created, and may be stored as a snap N+1: 648 and a snap N+2: 654 in the snapshot storage area 150.

Figure 8:
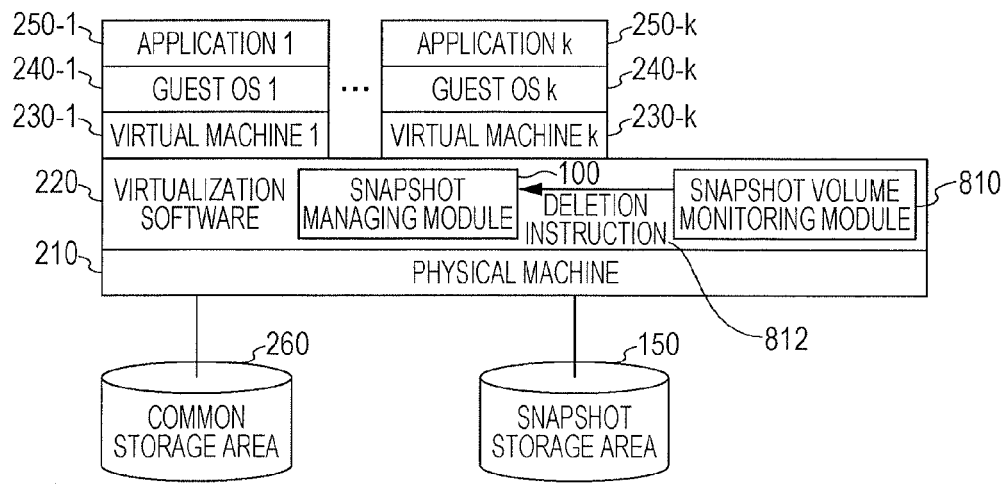
FIG. 8 is an explanatory diagram showing a processing example according to the exemplary embodiment.

FIG. 8 is an explanatory diagram showing a processing example according to this exemplary embodiment.

Processing of the snapshot volume monitoring module 810 is described in detail.

Since the snapshot storage area 150 stores plural snapshots, the plural snapshots may occupy a certain storage area. Hence, processing of the application 250 may be affected and a snapshot may not be created when necessary. Owing to this, processing for preventing such a situation from occurring is described.

The example shown in FIG. 8 is a configuration in which the snapshot volume monitoring module 810 is added to the virtualization software 220 of the example shown in FIG. 2.

The snapshot volume monitoring module 810 monitors the volume of the snapshot storage area 150. If a snapshot is newly created and if the volume is larger than the upper limit of a predetermined snapshot area, the snapshot volume monitoring module 810 instructs the snapshot managing module 100 to delete the oldest snapshot (deletion instruction 812).

Alternatively, the following processing may be executed.

A lifecycle value of a print job is added to the property of the print job. The lifecycle value may be a period until an inspection is performed for garbling, a color state, etc., after printing and completeness of a printed matter (satisfaction of a condition explicitly or implicitly requested for a printed matter) is assured; if the period for the assurance is not clear, a period until a next print job of the same kind is output (for example, an output per month); or a period until a printed matter is delivered to a customer and the acceptance is returned from the customer.

When a snapshot is created, the snapshot is stored in the snapshot storage area 150 together with a file including a print job ID of a print job executed since the previous snapshot is created till the current snapshot is created (information that uniquely specifies a print job in this exemplary embodiment, ID representing identification) and a lifecycle value. Among such files, if a file with the longest lifecycle goes past the time limit, the snapshot is deleted.

If the time limit (lifecycle value) is not previously determined, for example, information may be acquired from an external system (management information system (MIS)) or other system, and the time limit may be set.

However, if the volume of snapshots becomes larger than the threshold of the savable volume, snapshots may be successively deleted in order from the oldest one even if a print job which does not still reach the time limit still remains.

Figure 9:
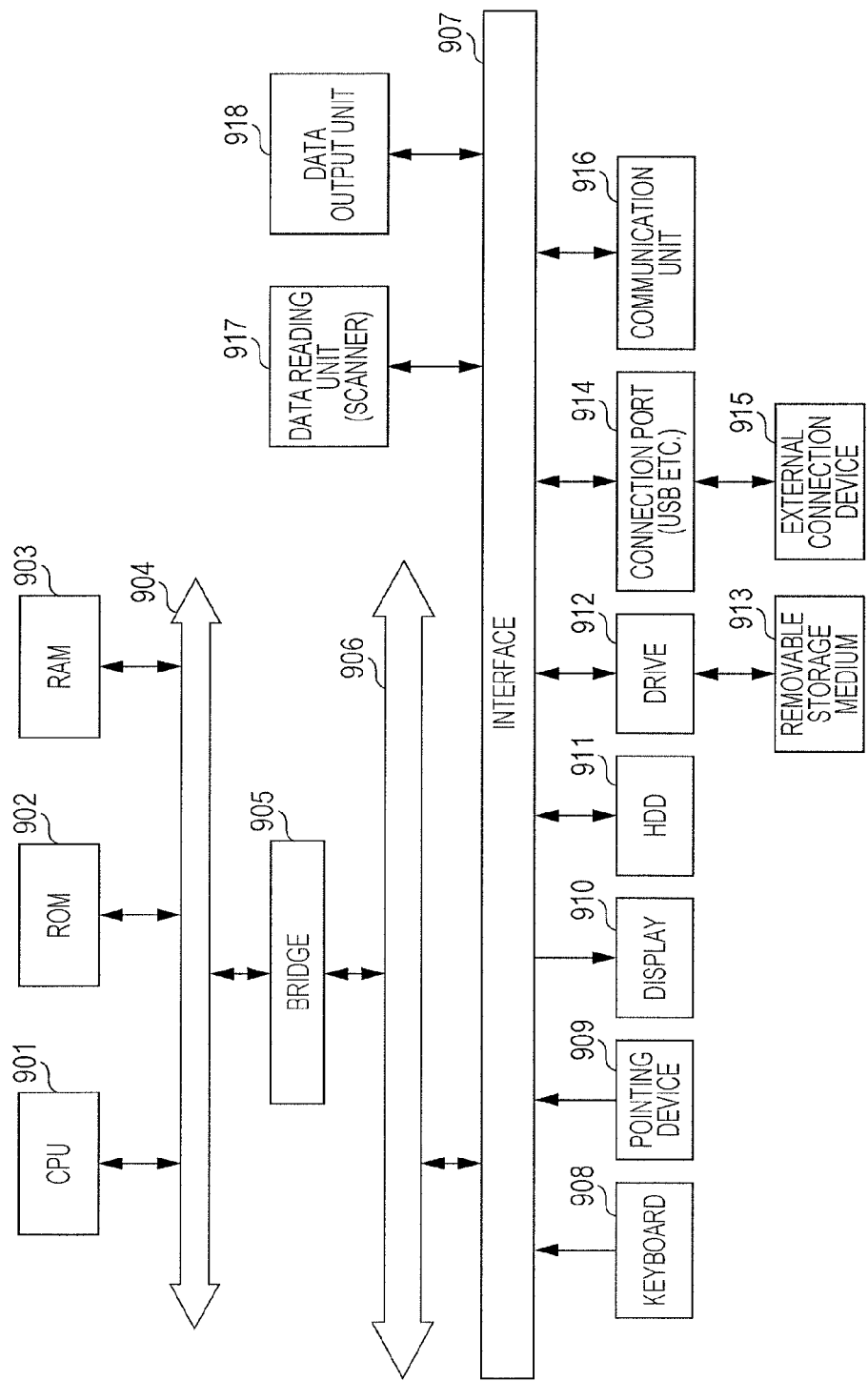
FIG. 9 is a block diagram showing a hardware configuration example of a computer that provides the exemplary embodiment.

Referring to FIG. 9, a hardware configuration example of an information processing device (the physical machine 210) according to this exemplary embodiment is described. The configuration shown in FIG. 9 is formed of, for example, a personal computer (PC), and is a hardware configuration example including a data reading unit 917 such as a scanner, and a data output unit 918 such as a printer.

A central processing unit (CPU) 901 is a controller that executes processing according to a computer program having written therein execution sequences of the respective modules described in the exemplary embodiment. In particular, the respective modules include the snapshot managing module 100, the snapshot creating module 110, the snapshot reading module 120, the snapshot deleting module 125, the snapshot merging module 130, the control module 140, the virtualization software 220, the virtual machine 230, the guest OS 240, and the application 250.

A read only memory (ROM) 902 stores a program, an operation parameter, etc., used by the CPU 901. A random access memory (RAM) 903 stores a program used during the execution by the CPU 901, a parameter that is properly changed during the execution, etc. The CPU 901, the ROM 902, and the RAM 903 are mutually connected through a host bus 904 formed of, for example, a CPU bus.

The host bus 904 is connected to an external bus 906 such as a peripheral component interconnect/interface (PCI) bus through a bridge 905.

A keyboard 908 and a pointing device 909 such as a mouse are input devices that are operated by an operator. A display 910 is a liquid crystal display device, a cathode ray tube (CRT), or the like, and displays various information as texts and image information.

A hard disk drive (HDD) 911 includes a hard disk therein, drives the hard disk, and causes the hard disk to record or reproduce a program executed by the CPU 901 and information. The hard disk stores snapshots, common data, execution requests, print jobs, and other data. Further, the hard disk stores various computer programs such as other various data processing programs.

A drive 912 reads data or a program recorded in a mounted removable recording medium 913, such as a magnetic disk, an optical disk, a magneto-optical disk, or a semiconductor memory, and supplies the data or program to the RAM 903 connected through an interface 907, the external bus 906, the bridge 905, and the host bus 904. The removable recording medium 913 is also available as a data storage area similar to a hard disk.

A connection port 914 is a port that connects an external connection device 915, and has a connection portion, such as USB or IEEE 1394. The connection port 914 is connected to the CPU 901 and other units through the interface 907, the external bus 906, the bridge 905, and the host bus 904. A communication unit 916 is connected to a communication line and executes data communication processing with an external device. The data reading unit 917 is, for example, a scanner, and executes reading processing for a document. The data output unit 918 is, for example, a printer, and executes output processing for document data.

The hardware configuration of the information processing device shown in FIG. 9 is a mere configuration example. The configuration of this exemplary embodiment is not limited to the configuration shown in FIG. 9, and may be any configuration as long as the modules described in this exemplary embodiment may be executed. For example, a part of the modules may be formed of dedicated hardware (for example, application specific integrated circuit, ASIC, or the like), a part of the modules may be arranged in an external system and may be connected through a communication line, and further the system shown in FIG. 9 may be multiple systems mutually connected through a communication line and the multiple systems may operate in an associated manner. Alternatively, a part of the modules may be arranged in a copier, a fax machine, a scanner, a printer, a multiple-function device (an image processing device having at least two functions of a scanner, a printer, a copier, and a fax).

Also, in the description of the exemplary embodiment, regarding comparison with a predetermined value, "be equal to or larger than," "be equal to or smaller than," "be larger than," and "be smaller (less) than," may be respectively interpreted as "be larger than," "be smaller (less) than," "be equal to or larger than," and "be equal to or smaller than" unless the combinations involve a contradiction.

Also, regarding a timing at which a snapshot is created, a snapshot may be created when reception of a print job is completed. In this case, re-transmission of a print job does not have to be urged as recovery processing. Alternatively, a snapshot may be created before printing by a printer. In this case, processing till printing does not have to be repeated as recovery processing.

Alternatively, a snapshot may be applied to plural virtual machines in accordance with the situation, and applications may be processed in parallel on the virtual machines. For example, if a print job with output by a large amount of printed matters is received, a snapshot after the reception is created. Then, if the speed of image generation for printing is insufficient (or expected to be insufficient) as compared with the print speed of a printer, plural virtual machines may be started up, and the created snapshot may be applied to the virtual machines, so that distributed image generation processing for printing is provided.

The described program may be stored in a recording medium and provided. Alternatively, the program may be provided by a communication unit. In this case, for example, the described program may be interpreted as an aspect of the invention of "a computer-readable recording medium storing a program."

"The computer-readable recording medium storing the program" represents a computer-readable recording medium storing a program, the medium which is used for, for example, installation and execution of the program, and distribution of the program.

For example, the recording medium may include a digital versatile disk (DVD), particularly, "DVD-R, DVD-RW, DVD-RAM, and the like" complying with the standard formulated by the DVD forum, "DVD+R, DVD+RW, and the like" complying with the standard formulated as DVD+RW; a compact disc (CD), particularly, a compact disc read only memory (CD-ROM), a compact disc recordable (CD-R), a compact disc rewritable (CD-RW), and the like; a blu-ray (registered trademark) disc; a magneto-optical disk (MO); a flexible disk (FD); a magnetic tape; a hard disk; a read only memory (ROM); electrically erasable programmable ROM (EEPROM, registered trademark); a flash memory; a random access memory (RAM); a secure digital (SD) card; and the like.

The above-described program or a part of the program may be recorded and saved in the recording medium, and may be distributed. Also, the above-described program or a part of the program may be transmitted by using a wired network, a wireless communication network, a transmission medium with a combination of the wired network and the wireless communication network, used for a local area network (LAN), a metropolitan area network (MAN), a wide area network (WAN), the Internet, an intranet, an extranet, or the like; or may be carried on a carrier wave.

Further, the program may be a part of other program, and may be recorded in a recording medium together with other program. Alternatively, the program may be recorded in a divided manner in plural recording media. Also, the program may be recorded in any form, for example, a compressed form or an encrypted form, as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer control system comprising:
at least one hardware processor is configured to implement:
a snapshot creating unit that creates at least one or more snapshots each having recorded therein a state of a virtual machine, the state including a printer control program that operates on a guest operating system installed on the virtual machine;
a snapshot managing unit that stores a snapshot created after the printer control program is installed and initialized in a snapshot storing unit, as a reference snapshot among the one or more snapshots created by the snapshot creating unit, and manages the reference snapshot; and
a program executing unit that requests the snapshot managing unit to cause the virtual machine to read the reference snapshot, and executes the printer control program when an execution request for the printer control program is received for processing of a print job.

2. The printer control system according to claim 1, wherein the at least one hardware processor is further configured to implement:
a common storage unit commonly available for the virtual machine recorded in the snapshot stored in the snapshot storing unit.

3. The printer control system according to claim 1, wherein the at least one hardware processor is further configured to implement:
a failure detector that detects a failure occurring during the execution of the printer control program,
wherein, if the failure detector detects the failure, the program executing unit temporarily stops the execution of the printer control program, and requests the snapshot creating unit to create a snapshot.

4. The printer control system according to claim 1, wherein the at least one hardware processor is further configured to implement:
   a monitoring unit that monitors a total storage volume of snapshots stored in the snapshot storing unit,
   wherein the monitoring unit requests the snapshot managing unit to delete a snapshot that satisfies a predetermined condition among the volume of snapshots if the total storage volume is equal to or larger than a predetermined volume.

5. The printer control system according to claim 4, wherein the predetermined condition is that a snapshot is selected in order from a snapshot, a stored timing of which in the snapshot storing unit is the oldest.

6. The printer control system according to claim 4, wherein the predetermined condition is that a snapshot corresponding to a print job, an inspection for a printed matter of which is completed, is deleted.

7. A printer control method comprising:
   creating at least one or more snapshots each having recorded therein a state of a virtual machine, the state including a printer control program that operates on a guest operating system installed on the virtual machine;
   storing a snapshot created after the printer control program is installed and initialized in a snapshot storing unit, as a reference snapshot among the one or more snapshots created by a snapshot creating unit, and managing the reference snapshot; and
   requesting a snapshot managing unit to cause the virtual machine to read the reference snapshot, and executing the printer control program when an execution request for the printer control program is received for processing of a print job.

8. A non-transitory computer readable medium storing a program causing a computer to execute a process for printer control, the process comprising:
   creating at least one or more snapshots each having recorded therein a state of a virtual machine, the state including a printer control program that operates on a guest operating system installed on the virtual machine;
   storing a snapshot created after the printer control program is installed and initialized in a snapshot storing unit, as a reference snapshot among the one or more snapshots created by a snapshot creating unit, and managing the reference snapshot; and
   requesting a snapshot managing unit to cause the virtual machine to read the reference snapshot, and executing the printer control program when an execution request for the printer control program is received for processing of a print job.

* * * * *